US012421648B2

(12) United States Patent
Ahamad et al.

(10) Patent No.: US 12,421,648 B2
(45) Date of Patent: Sep. 23, 2025

(54) HINGE SYSTEM FOR A LAUNDRY MACHINE

(71) Applicant: WHIRLPOOL CORPORATION, Benton Harbor, MI (US)

(72) Inventors: Iftkhar Ahamad, Pune (IN); William Buscarato, Rio Claro (BR); Emmanuel Gonzaga, Rio Claro (BR); Vinayak Jadhav, Pune (IN); Helton Rossi, Rio Claro (BR); Chaitanya Salve, Pune (IN); Hector A. Villarreal, Monterrey (MX)

(73) Assignee: Whirlpool Corporation, Benton Harbor, MI (US)

( * ) Notice: Subject to any disclaimer, the term of this patent is extended or adjusted under 35 U.S.C. 154(b) by 431 days.

(21) Appl. No.: 18/079,134

(22) Filed: Dec. 12, 2022

(65) Prior Publication Data

US 2024/0191420 A1 Jun. 13, 2024

(51) Int. Cl.
*D06F 39/14* (2006.01)
*E05D 3/02* (2006.01)

(52) U.S. Cl.
CPC ............... *D06F 39/14* (2013.01); *E05D 3/02* (2013.01); *E05Y 2900/312* (2013.01)

(58) Field of Classification Search
CPC ...... D06F 39/14; E05D 3/02; E05Y 2900/312
USPC .......................................................... 68/196
See application file for complete search history.

(56) References Cited

U.S. PATENT DOCUMENTS

| | | | |
|---|---|---|---|
| 4,787,121 A | 11/1988 | Racenis et al. | |
| 10,604,881 B1 | 3/2020 | Allen et al. | |
| 11,021,834 B2 | 6/2021 | Ahamad et al. | |
| 11,118,303 B2 | 9/2021 | Ahamad et al. | |
| 11,131,057 B2 | 9/2021 | Ahamad et al. | |
| 2020/0199805 A1* | 6/2020 | Ahamad | E05D 3/02 |
| 2021/0062560 A1* | 3/2021 | Jager | E05D 7/1061 |

* cited by examiner

*Primary Examiner* — Tinsae B Ayalew
(74) *Attorney, Agent, or Firm* — Brooks Kushman. P.C.

(57) ABSTRACT

A laundry machine includes a cabinet, a lid, and a hinge. The cabinet is configured to receive clothing articles. The lid is secured to a top of the cabinet and is configured to transition between open and closed positions. The hinge rotatably secures the lid to the cabinet such the lid transitions between the open and closed positions via the hinge. The hinge comprises a post and an L-shaped bracket. The post protrudes upward from the top of the cabinet. The L-shaped bracket is disposed along a bottom of the lid and is configured to rotatably engage the post to transition the lid between the open and closed positions.

20 Claims, 7 Drawing Sheets

HINGE SYSTEM FOR A LAUNDRY MACHINE

TECHNICAL FIELD

The present disclosure relates to washing or laundry machines.

BACKGROUND

Washing machines are configured to clean clothes, garments, or other clothing articles.

SUMMARY

A laundry machine includes a cabinet, a lid, and a hinge. The cabinet defines an internal cavity configured to receive clothing articles. The lid is configured to transition between open and closed positions. The lid covers an opening to the internal cavity in the closed position and provides access to the opening in the open position. The hinge rotatably secures the lid to the cabinet such that the lid transitions between the open and closed positions via the hinge. The hinge comprises a post and an L-shaped bracket. The post is secured to the cabinet. The L-shaped bracket is secured to the lid and is configured to rotatably receive the post such that the L-shaped bracket and lid are rotatable about the post to transition the lid between the open and closed positions.

A laundry machine includes a cabinet, a lid, and a hinge. The cabinet is configured to receive clothing articles. The lid is secured to a top of the cabinet and is configured to transition between open and closed positions. The hinge rotatably secures the lid to the cabinet such that the lid transitions between the open and closed positions via the hinge. The hinge comprises a post and an L-shaped bracket. The post protrudes upward from the top of the cabinet. The L-shaped bracket is disposed along a bottom of the lid and is configured to rotatably engage the post to transition the lid between the open and closed positions.

A laundry machine includes a cabinet, a lid, and first and second opposing hinges. The cabinet defines an internal cavity configured to receive clothing articles. The lid is secured to a top of the cabinet and is configured to transition between open and closed positions. The first and second opposing hinges rotatably secure first and second lower corners of the lid to the cabinet, respectively, such that the lid transitions between the open and closed positions via the hinges. Each of the first and second hinges comprise a post and an L-shaped bracket. The post protrudes upward from the top of the cabinet proximate to an opening to the internal cavity. The L-shaped bracket is disposed along a bottom of the lid and is configured to rotatably engage the corresponding post to transition the lid between the open and closed positions.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Illustrative washing machines in accordance with the present disclosure include a rotatable clothes mover or agitator and a rotatable basket or drum. Clothes movers generally oscillate, or rotate back and forth, in accordance with a stroke angle, to provide agitation to a laundry load during washing operations. Clothes movers and rotatable baskets generally spin together during spin cycle operations. To enable both of these functionalities, including oscillation by the clothes mover and joint spinning by the clothes mover and basket, a common drive system may be included. Such a drive system can include a drive mechanism or transmission for translating movement from an electric machine or motor into rotational movement of the basket and clothes mover by the use of a drive shaft that is operably coupled to a series of gears or gearing arrangement. Traditional drive mechanisms may include the use of a sun gear, a set of planetary gears, and an external ring gear. The planetary gears are often provided as spur gears. However, the gears may alternatively be helical gears in place of conventional spur gears in the drive mechanism. Traditional drive mechanisms, however, are not limited to planetary gear systems.

Figure 1:
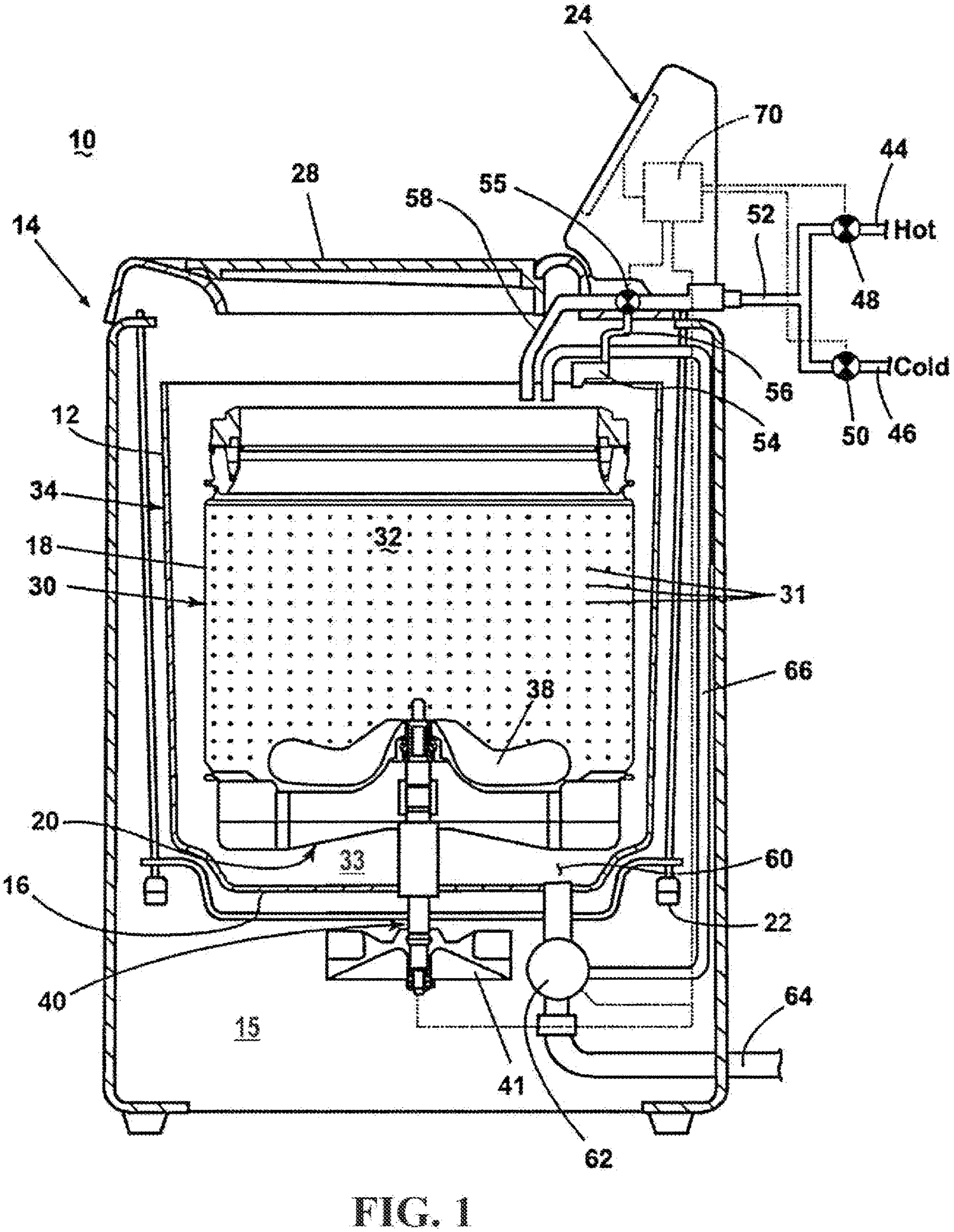
FIG. 1 illustrates a schematic cross-sectional view of a laundry treating appliance in the form of a laundry or washing machine according to the present disclosure.

FIG. 1 illustrates a schematic cross-sectional view of a laundry treating appliance shown in the form of a laundry or washing machine 10 according to one embodiment of the present disclosure. While the laundry treating appliance is illustrated as a vertical axis, top-fill washing machine, the embodiments of the present disclosure can have applicability in other fabric treating appliances, non-limiting examples of which include a combination washing machine and dryer, a refreshing/revitalizing machine, an extractor, or a non-aqueous washing apparatus.

Washing machines are typically categorized as either a vertical axis washing machine or a horizontal axis washing machine. As used herein, the "vertical axis" washing machine refers to a washing machine having a rotatable drum, perforate or imperforate, that holds fabric items and a clothes mover, such as an agitator, impeller, nutator, and the like within the drum. The clothes mover moves within the drum to impart mechanical energy directly to the clothes or indirectly through wash liquid in the drum. The clothes mover may typically be moved in a reciprocating rotational movement. In some vertical axis washing machines, the drum rotates about a vertical axis generally perpendicular to a surface that supports the washing machine. However, the rotational axis need not be vertical. The drum may rotate about an axis inclined relative to the vertical axis. As used herein, the "horizontal axis" washing machine refers to a washing machine having a rotatable drum, perforated or imperforate, that holds fabric items and washes the fabric items by the fabric items rubbing against one another as the drum rotates. In some horizontal axis washing machines, the drum rotates about a horizontal axis generally parallel to a surface that supports the washing machine. However, the rotational axis need not be horizontal. The drum may rotate about an axis inclined relative to the horizontal axis. In horizontal axis washing machines, the clothes are lifted by the rotating drum and then fall in response to gravity to form a tumbling action. Mechanical energy is imparted to the clothes by the tumbling action formed by the repeated lifting and dropping of the clothes. Vertical axis and horizontal axis machines are best differentiated by the manner in which they impart mechanical energy to the fabric articles. The illustrated exemplary washing machine of FIG. 1 is a vertical axis washing machine.

The washing machine 10 may include a structural support system comprising a cabinet 14 that defines an interior space or internal cavity 15, within which a laundry holding system resides. The cabinet 14 may be a housing having a chassis and/or a frame defining an interior that receives components typically found in a conventional washing machine, such as electric machines (e.g., motors), pumps, fluid lines, controls, sensors, transducers, and the like. Such components will not be described further herein except as necessary for a complete understanding of the present disclosure.

The fabric holding system of the illustrated exemplary washing machine 10 may include a rotatable drum or basket 30 having an open top that can be disposed within the interior of the cabinet 14 (e.g., within internal cavity 15) and may define second internal space, internal cavity, or treating chamber 32 for receiving laundry items for treatment. The top of the cabinet 14 can include a selectively openable lid 28 to provide access into the laundry treating chamber 32 through the open top of the basket 30. A washtub or tub 34 can also be positioned within the internal cavity 15 defined by the cabinet 14 and can define a third interior space or internal cavity 33 within which the basket 30 can be positioned. The tub 34 can have a generally cylindrical side or tub peripheral wall 12 closed at its bottom end by a base 16 that can at least partially define a sump 60.

The basket 30 can have a generally peripheral side wall 18, which is illustrated as a cylindrical side wall, closed at the basket end by a basket base 20 to at least partially define the treating chamber 32. The basket 30 can be rotatably mounted within the tub 34 for rotation about a vertical basket axis of rotation relative to the tub 34 and can include a plurality of perforations 31, such that liquid may flow between the tub 34 and the rotatable basket 30 through the perforations 31. While the illustrated washing machine 10 includes both the tub 34 and the basket 30, with the basket 30 defining the treating chamber 32, it is within the scope of the present disclosure for the laundry treating appliance to include only one receptacle, with the receptacle defining the laundry treatment chamber for receiving the load to be treated.

An agitator or clothes mover 38 may be disposed and rotatably mounted within the basket 30 to impart mechanical agitation to a load of laundry placed in the basket 30. The clothes mover 38 can be oscillated or rotated about its axis of rotation during a cycle of operation in order to produce load motion effective to wash the load contained within the treating chamber 32. Types of laundry movers include, but are not limited to, an agitator, a wobble plate, and a hybrid impeller/agitator.

The basket 30 and the clothes mover 38 may be driven by a drive system 40 that includes power sources, such as an electric machine or motor 41, and a transmission operably coupled with the basket 30 and clothes mover 38. The electric machine or motor 41 is configured to generate power to rotate the basket 30 and the clothes mover 38, and to oscillate the clothes mover 38. The transmission is configured to deliver power from a power source (e.g., motor 41) to the basket 30 and/or the clothes mover 38. The transmission may include a gearing arrangement or gear case. The transmission may also include additional components such as input and output shafts. The motor 41 may rotate the basket 30 at various speeds in either rotational direction about the vertical axis of rotation, including at a spin speed wherein a centrifugal force at the inner surface of the basket side wall 18 is 1 g or greater. Spin speeds are commonly known for use in extracting liquid from the laundry items in the basket 30, such as after a wash or rinse step in a treating cycle of operation. A loss motion device or clutch can be included in the drive system 40 and can selectively operably couple the motor 41 with either the basket 30 and/or the clothes mover 38.

A suspension system 22 can dynamically hold the tub 34 within the cabinet 14. The suspension system 22 can dissipate a determined degree of vibratory energy generated by the rotation of the basket 30 and/or the clothes mover 38 during a treating cycle of operation. Together, the tub 34, the basket 30, and any contents of the basket 30, such as liquid and laundry items, define a suspended mass for the suspension system 22.

A liquid supply system can provide liquid, such as water or a combination of water and one or more wash aids, such as detergent, into the treating chamber 32. The liquid supply system may include a water supply configured to supply hot or cold water. The water supply may include a hot water inlet 44 and a cold water inlet 46, a valve assembly, which can include a hot water valve 48, a cold water valve 50, and a diverter valve 55, and various conduits 52, 56, 58. The valves 48, 50 are selectively openable to provide water, such as from a household water supply (not shown) to the conduit 52. The valves 48, 50 can be opened individually or together to provide a mix of hot and cold water at a selected temperature. While the valves 48, 50 and conduit 52 are illustrated as positioned on the exterior of the cabinet 14, it may be understood that these components may be internal to the housing.

As illustrated, a detergent dispenser 54 can be fluidly coupled with the conduit 52 through a diverter valve 55 and a first water conduit 56. The detergent dispenser 54 can include means for supplying or mixing detergent to or with water from the first water conduit 56 and can supply such treating liquid to the tub 34. It has been contemplated that water from the first water conduit 56 can also be supplied to the tub 34 through the detergent dispenser 54 without the addition of a detergent. A second water conduit, illustrated as a separate water inlet 58, can also be fluidly coupled with the conduit 52 through the diverter valve 55 such that water can be supplied directly to the treating chamber through the open top of the basket 30. Additionally, the liquid supply system can differ from the configuration shown, such as by inclusion of other valves, conduits, wash aid dispensers, heaters, sensors, such as water level sensors and temperature sensors, and the like, to control the flow of treating liquid through the washing machine 10 and for the introduction of more than one type of detergent/wash aid.

A liquid recirculation system may be provided for recirculating liquid from the tub 34 into the treating chamber 32. More specifically, a sump 60 can be located in the bottom of the tub 34 and the liquid recirculation system can be configured to recirculate treating liquid from the sump 60 onto the top of a laundry load located in the treating chamber 32. A pump 62 can be housed below the tub 34 and can have an inlet fluidly coupled with the sump 60 and an outlet configured to fluidly couple to either or both a household drain 64 or a recirculation conduit 66. In this configuration, the pump 62 can be used to drain or recirculate wash water in the sump 60. As illustrated, the recirculation conduit 66 can be fluidly coupled with the treating chamber 32 such that it supplies liquid into the open top of the basket 30. The liquid recirculation system can include other types of recirculation systems.

It is noted that the illustrated drive system, suspension system, liquid supply system, and recirculation and drain system are shown for exemplary purposes only and are not limited to the systems shown in the drawings and described above. For example, the liquid supply, recirculation, and pump systems can differ from the configuration shown in FIG. 1, such as by inclusion of other valves, conduits, treating chemistry dispensers, sensors (such as liquid level sensors and temperature sensors), and the like, to control the flow of liquid through the washing machine 10 and for the introduction of more than one type of treating chemistry. For example, the liquid supply system can be configured to supply liquid into the interior of the tub 34 not occupied by the basket 30 such that liquid can be supplied directly to the tub 34 without having to travel through the basket 30. In another example, the liquid supply system can include a single valve for controlling the flow of water from the household water source. In another example, the recirculation and pump system can include two separate pumps for recirculation and draining, instead of the single pump as previously described.

The washing machine 10 can also be provided with a heating system (not shown) to heat liquid provided to the treating chamber 32. In one example, the heating system can include a heating element provided in the sump to heat liquid that collects in the sump. Alternatively, the heating system can be in the form of an in-line heater that heats the liquid as it flows through the liquid supply, dispensing and/or recirculation systems.

The washing machine 10 may further include a controller 70 coupled with various working components of the washing machine 10 to control the operation of the working components and to implement one or more treating cycles of operation. The control system can further include a user interface 24 that is operably coupled with the controller 70. The user interface 24 can include one or more knobs, dials, switches, displays, touch screens and the like for communicating with the user, such as to receive input and provide output. The user can enter different types of information including, without limitation, cycle selection and cycle parameters, such as cycle options.

The controller 70 can include the machine controller and any additional controllers provided for controlling any of the components of the washing machine 10. For example, the controller 70 can include the machine controller and a motor controller. Many known types of controllers can be used for the controller 70. It is contemplated that the controller is a microprocessor-based controller that implements control software and sends/receives one or more electrical signals to/from each of the various working components to implement the control software. As an example, proportional control (P), proportional integral control (PI), and proportional derivative control (PD), or a combination thereof, a proportional integral derivative control (PID), can be used to control the various components of the washing machine 10.

Figure 2:
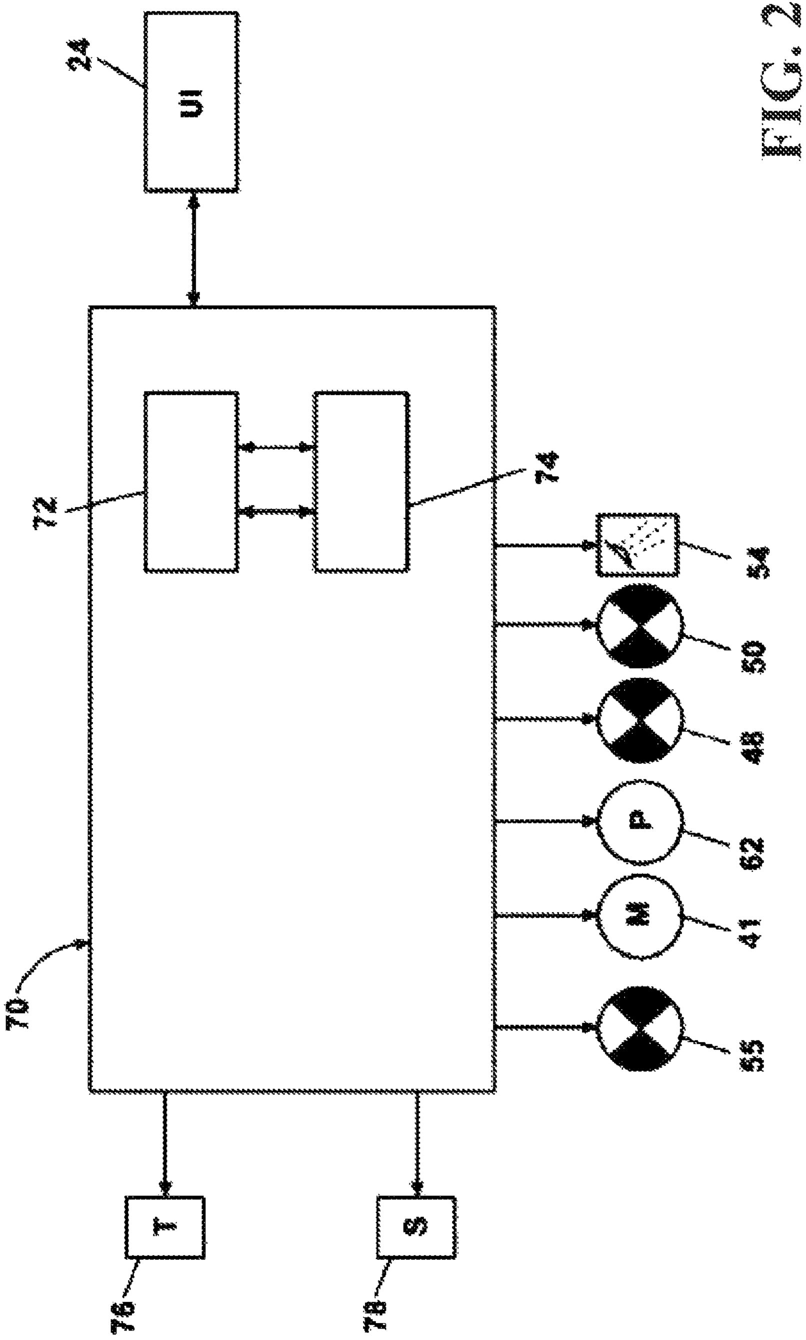
FIG. 2 illustrates a schematic representation of a controller for controlling the operation of one or more components of the laundry treating appliance.
Figure 3:
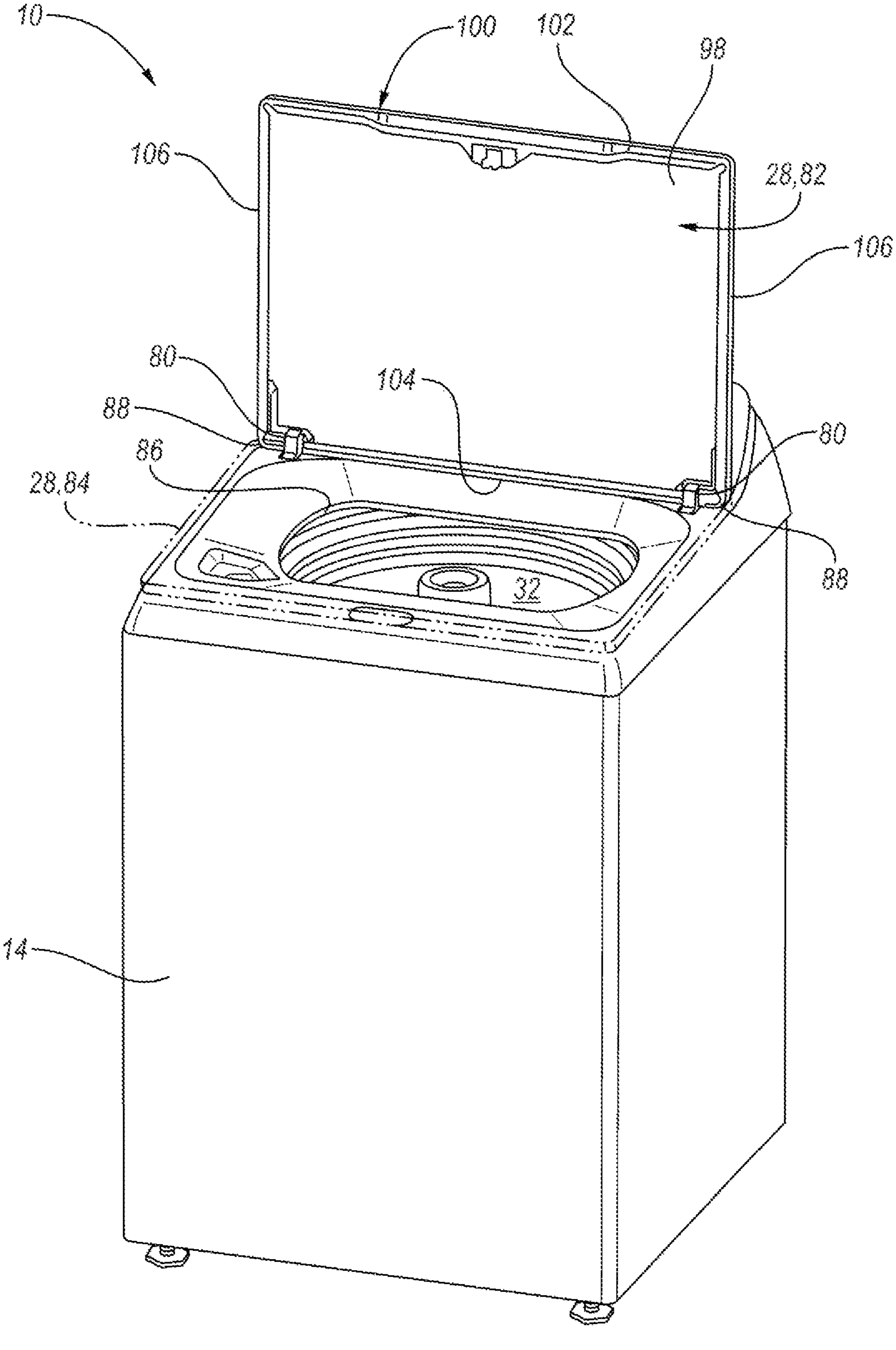
FIG. 3 is an isometric front view of the laundry treating appliance including a lid for the laundry treating appliance.
Figure 4:
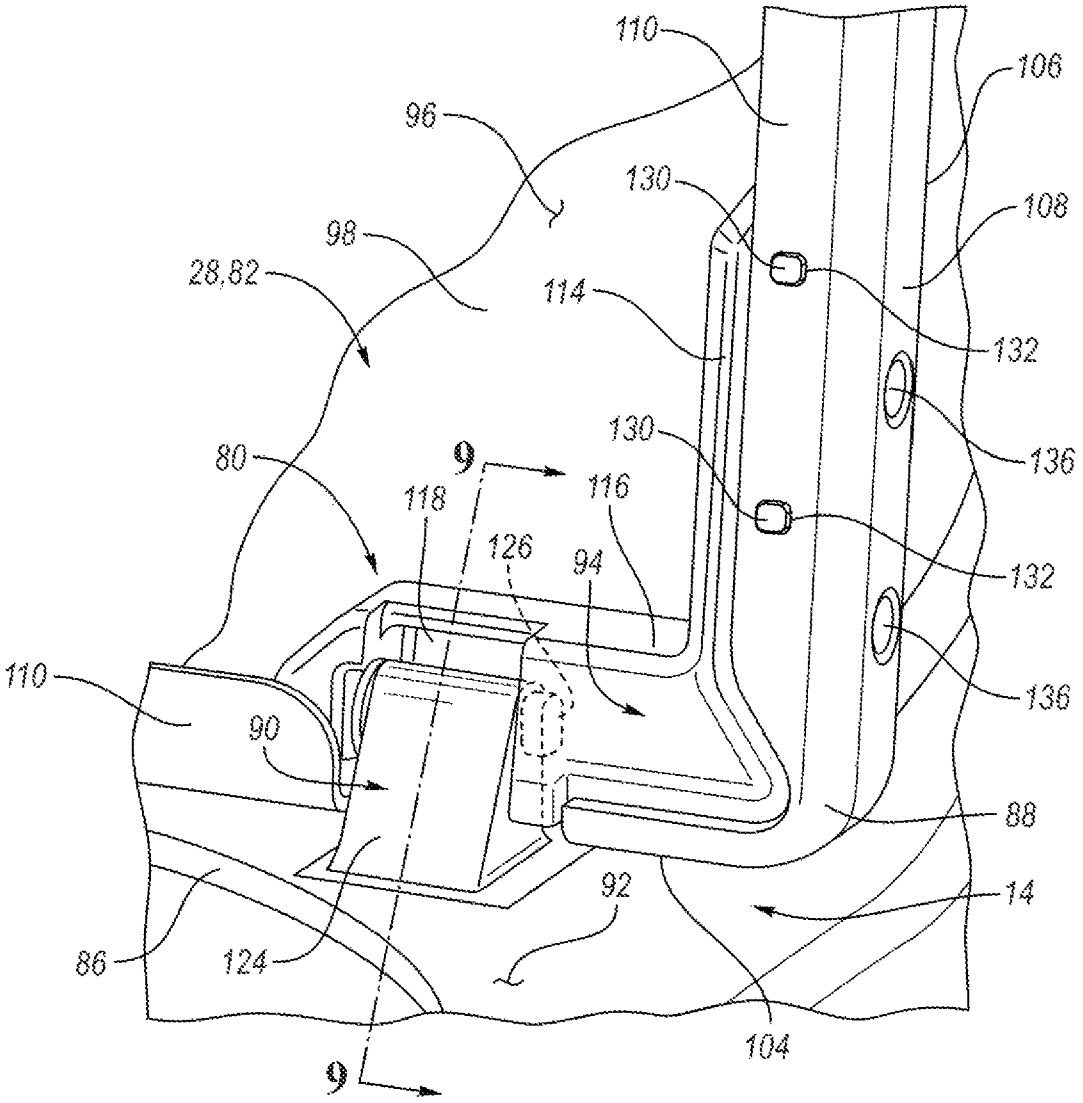
FIG. 4 is an isometric view of a hinge system for the lid.
Figure 5:
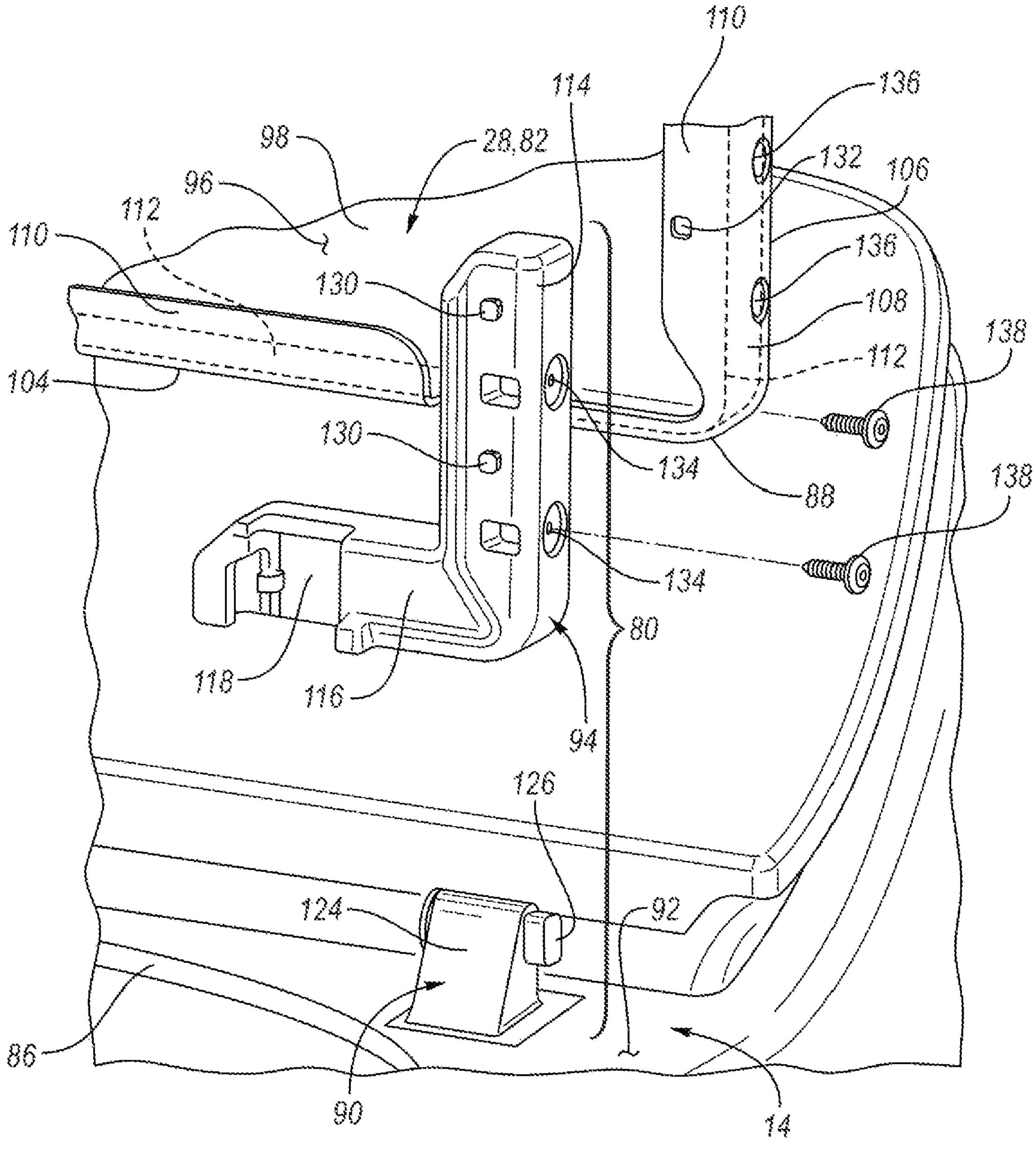
FIG. 5 is an isometric exploded view of the hinge system.
Figure 6:
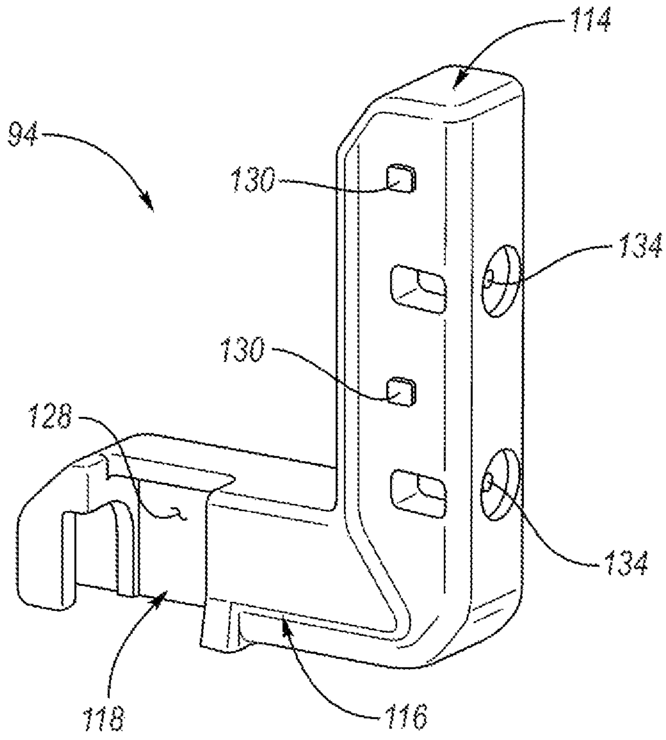
FIG. 6 is a left-side front isometric view of an L-bracket of the hinge system.
Figure 7:
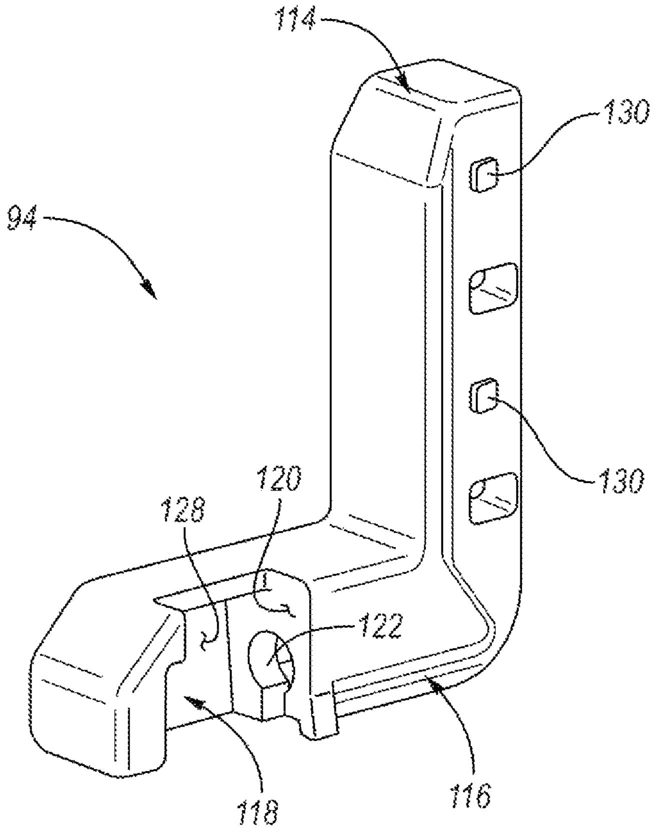
FIG. 7 is a right-side front isometric view of the L-bracket.
Figure 8:
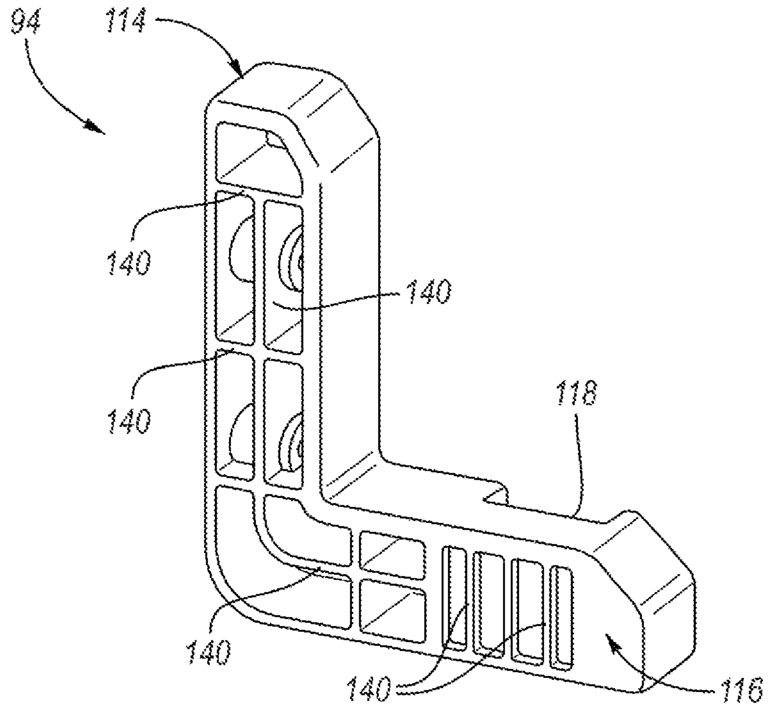
FIG. 8 is a rear isometric view of the L-bracket.
Figure 9:
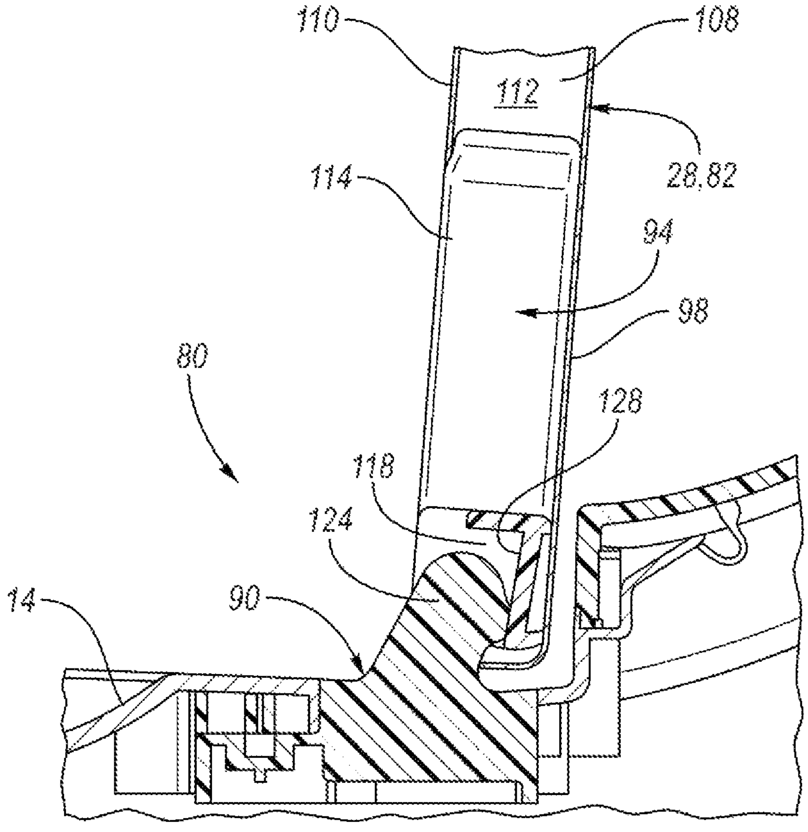
FIG. 9 is a cross-sectional view of the hinge system taken along line 9-9 in FIG. 4.

As illustrated in FIG. 2, the controller 70 can be provided with a memory 72 and a central processing unit (CPU) 74. The memory 72 can be used for storing the control software that can be executed by the CPU 74 in completing a cycle of operation using the washing machine 10 and any additional software. Examples, without limitation, of treating cycles of operation include: wash, heavy-duty wash, delicate wash, quick wash, pre-wash, refresh, rinse only, and timed wash, which can be selected at the user interface 24. The memory 72 can also be used to store information, such as a database or table, and to store data received from the one or more components of the washing machine 10 that can be communicably coupled with the controller 70. The database or table can be used to store the various operating parameters for the one or more cycles of operation, including factory default values for the operating parameters and any adjustments to them by the control system or by user input.

The controller 70 may be operably coupled with one or more components of the washing machine 10 for communicating with and/or controlling the operation of the components to complete a cycle of operation. For example, the controller 70 may be coupled with the hot water valve 48, the cold water valve 50, diverter valve 55, and the detergent dispenser 54 for controlling the temperature and flow rate of treating liquid into the treating chamber 32; the pump 62 for controlling the amount of treating liquid in the treating chamber 32 or sump 60; drive system 40 including motor 41 for controlling the direction and speed of rotation of the basket 30 and/or the clothes mover 38; and the user interface 24 for receiving user selected inputs and communicating information to the user. The controller 70 can also receive input from a temperature sensor 76, such as a thermistor, which can detect the temperature of the treating liquid in the treating chamber 32 and/or the temperature of the treating liquid being supplied to the treating chamber 32. The controller 70 can also receive input from various additional sensors 78, which are known in the art and not shown for simplicity. Non-limiting examples of additional sensors 78 that can be communicably coupled with the controller 70 include: a weight sensor, and a motor torque sensor.

While illustrated as one controller, the controller 70 may be part of a larger control system and may control or be controlled by various other controllers throughout the washing machine 10. It should therefore be understood that the controller 70 and one or more other controllers can collectively be referred to as a "controller" that controls various subcomponents or actuators of the washing machine 10 in response to signals from various subcomponents or sensors of the washing machine 10 to control various functions. The controller 70 may include the microprocessor or central processing unit (CPU) 74, which may be in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 70 in controlling the washing machine 10.

Referring to FIGS. 3-9, a hinge system for the lid 28 is illustrated. The hinge system may include first and second opposing hinges 80 that rotatably secure the lid 28 to the cabinet 14. Only a first of the hinges 80 is illustrated in FIGS. 4-9. However, it should be understood that the second of the hinges 80 should be construed to have the same components, functionality, etc. unless otherwise stated herein. For example, the second hinge 80 may be a mirror image of the first hinge 80.

The lid 28 is secured to a top of the cabinet 14 and is configured to transition between an open position 82 and a closed position 84. The lid 28 covers an opening 86 to the internal cavity (e.g., internal cavity 15, treating chamber 32, and/or third internal cavity 33) in the closed position 84 and provides access to the opening 86 in the open position 82. The first and second opposing hinges 80 rotatably secure the lid 28 to the cabinet 14 such that the lid 28 transitions between the open position 82 and the closed position 84 via the hinges 80. More specifically, the first and second opposing hinges 80 may rotatably secure first and second lower or bottom corners 88 of the lid 28 to the cabinet 14.

Referring to FIGS. 4-9, a first of the hinges 80 is illustrated. The hinge 80 includes a post 90. The post 90 is secured to the cabinet 14. The post 90 protrudes upward from a top 92 or top surface of the cabinet 14 proximate to the opening 86. The hinge 80 further includes an L-shaped bracket 94 that is secured to the lid 28. The L-shaped bracket 94 is disposed along a bottom 96 or bottom surface of the lid 28. The L-shaped bracket 94 is configured to rotatably engage or rotatably receive the post 90 such that the L-shaped bracket 94 and lid 28 are rotatable about the post 90 to transition the lid 28 between the open position 82 and closed position 84. The L-shaped bracket 94 may be disposed along one of the bottom corners 88 of the lid 28.

The lid 28 includes an upper panel 98. The lid 28 includes an outer peripheral edge 100. The outer peripheral edge 100 includes a front edge 102, a back edge 104, and side edges 106. A web 108 extends downward from the outer peripheral edge 100. The web 108 may extend downward from each of the front edge 102, back edge 104, and side edges 106. A flange 110 may extend inward from the web 108. The flange 110 may extend inward from the web 108 along each of the front edge 102, back edge 104, and side edges 106. Sections of each of the web 108 and flange 110 may be cut out to define openings to receive or provide access to various components (e.g., the L-shaped brackets 94) or to simplify the manufacturing process (e.g., along the corners of the upper panel 98). The upper panel 98, web 108, and flange 110 may collectively define a C-channel 112 along areas where sections the web 108 and the flange 110 have not been cut out.

The L-shaped bracket 94 includes a first leg 114 and a second leg 116. The first leg 114 is secure to the lid 28 and is disposed within the C-channel 112 along one of the side edges 106 of the lid 28. The second leg 116 is disposed along the back edge 104 of the lid 28. The second leg 116 rotatably receives or rotatably engages the post 90. The second leg 116 defines a notch 118 and the post 90 is disposed within the notch 118. More specifically, (i) a first internal surface 120 of the L-shaped bracket 94 both partially defines the notch 118 and defines a bushing orifice 122 extending away or outward from the notch 118; (ii) the post 90 includes a base 124 and a pin 126 protruding outward from the base 124; and (iii) the pin 126 is disposed and rotatable within the bushing orifice 122 such that the L-shaped bracket 94 and lid 28 are rotatable about the post 90 via the engagement between the pin 126 and bushing orifice 122.

A second internal surface 128 of the L-shaped bracket also partially defines the notch 118 and is adjacent to the first internal surface 120. The second internal surface 128 may be configured to operate as a stop that engages the base 124 when the lid 28 is in the open position 82 to limit a rotational range of the lid 28 about the hinge 80 and maintain the lid 28 in the open position 82. More specifically, the engagement between the second internal surface 128 and the base 124 may be configured to maintain a position of the upper panel 98 of lid 28 that ranges between 90° and 100° from a horizontal position when the lid 28 is in the open position 82.

The first leg 114 may include alignment protrusions 130 extending therefrom. The flange 110 may define alignment orifices 132. The alignment protrusions 130 may be configured to engage the alignment orifices 132 to place the L-shaped bracket 94 in a desired position relative to the lid 28. The alignment protrusions 130 may also be snaps or clips that engage the flange 110 within or proximate to the alignment orifices 132 to facilitate securing the L-shaped bracket 94 to the lid 28.

The first leg 114 may further define tapped orifices 134. The surface of the L-shaped bracket 94 defining the tapped orifices 134 may be perpendicular to the surface of the L-shaped bracket 94 that the alignment protrusions 130 extend from. The web 108 may define through holes 136. The tapped orifices 134 and the through holes 136 may have corresponding patterns that are configured to align with each other. Fasteners 138 may extend through the through holes 136 and engage the tapped orifices 134 to secure the L-shaped bracket 94 to the lid 28. Alternatively, the orifices 134 may initially be through holes, the fasteners 138 may be self-tapping, and the engagement of the fasteners 138 with orifices 134 may resulting in tapping orifices 134.

The L-shaped bracket 94 may include several bosses or ribs 140 that increase the stiffness and structural integrity of the L-shaped bracket 94. The bosses or ribs 140 may extending horizontally, vertically, or in any desirable direction to counteract a load applied to the L-shaped bracket 94. For example, the ribs 140 may operate to counteract the cantilevered force applied to the L-shaped bracket 94 from the lid 28.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A laundry machine comprising:

a cabinet defining an internal cavity;

a lid configured to transition between open and closed positions, wherein the lid covers an opening to the internal cavity in the closed position and provides access to the opening in the open position, wherein the lid includes (i) an upper panel, (ii) a web extending downward from a side edge of the upper panel, and (iii) a flange extending inward from the web, and wherein the upper panel, web, and flange collectively define a C-channel; and a hinge rotatably securing the lid to the cabinet such that the lid transitions between the open and closed positions via the hinge, the hinge comprising, a post secured to the cabinet, and an L-shaped bracket secured to the lid and configured to rotatably receive the post such that the L-shaped bracket and lid are rotatable about the post to transition the lid between the open and closed positions, wherein (i) the L-shaped bracket includes first and second legs, (ii) the first leg is disposed within the C-channel, (iii) the second leg is disposed along a back edge of the lid, (iv) the second leg rotatably receives the post, (v) the second leg defines a notch, (vi) the post is disposed within the notch, (vii) a first internal surface of the L-shaped bracket partially defines the notch and defines a bushing orifice extending away from the notch, (viii) the post includes a base and a pin protruding outward from the base, (ix) the pin is disposed within the bushing orifice such that the L-shaped bracket and lid are rotatable about the post via the engagement between the pin and bushing orifice, (x) a second internal surface of the L-shaped bracket partially defines the notch and is adjacent to the first internal surface, and (xi) the second internal surface is configured to engage the base to limit a rotational range of the lid and maintain the lid in the open position.

2. The laundry machine of claim 1, wherein (i) the first leg includes alignment protrusions extending therefrom, (ii) the flange defines alignment orifices, and (iii) the alignment protrusions are configured to engage the alignment orifices to position the L-shaped bracket relative to the lid.

3. The laundry machine of claim 1, wherein (i) the first leg defines tapped orifices, (ii) the web defines through holes, and (iii) fasteners extend through the through holes and engage the tapped orifices to secure the L-shaped bracket to the lid.

4. The laundry machine of claim 1, wherein the L-shaped bracket is disposed along a bottom corner of the lid.

5. The laundry machine of claim 1, wherein the pin extends horizontally.

6. A laundry machine comprising:

a cabinet;

a lid secured to a top of the cabinet and configured to transition between open and closed positions; and a hinge rotatably securing the lid to the cabinet such the lid transitions between the open and closed positions via the hinge, the hinge comprising, a post protruding upward from the top of the cabinet, and an L-shaped bracket disposed along a bottom of the lid and configured to rotatably engage the post to transition the lid between the open and closed positions, wherein (i) the L-shaped bracket includes first and second legs, (ii) the first leg is secured to the lid, (iii) the second leg rotatably engages the post, (iv) the second leg defines a notch, (v) the post is disposed within the notch, (vi) an internal surface of the L shaped bracket partially defines the notch, (vii) the post includes a base, (viii) the internal surface is configured to engage the base to limit a rotational range of the lid and maintain the lid in the open position.

7. The laundry machine of claim 6, wherein (i) the first leg includes alignment protrusions extending therefrom, (ii) the lid defines alignment orifices, and (iii) the alignment protrusions are configured to engage the alignment orifices to position the L-shaped bracket relative to the lid.

8. The laundry machine of claim 6, wherein (i) the first leg defines tapped orifices, (ii) the lid defines through holes, and (ii) fasteners extend through the through holes and engage the tapped orifices to secure the L-shaped bracket to the lid.

9. The laundry machine of claim 6, wherein (i) a second internal surface of the L-shaped bracket partially defines the notch and defines a bushing orifice extending away from the notch, (ii) the post includes a pin protruding outward from the base, and (iii) the pin is disposed within the bushing orifice such that the L-shaped bracket and lid are rotatable about the post via the engagement between the pin and bushing orifice.

10. The laundry machine of claim 6, wherein the L-shaped bracket is disposed along a corner of the lid.

11. The laundry machine of claim 6, wherein the lid includes (i) an upper panel, (ii) a web extending the upper panel, and (iii) a flange extending from the web.

12. The laundry machine of claim 11, wherein the upper panel, web, and flange define a C-channel.

13. The laundry machine of claim 12, wherein the first leg is disposed within the C-channel.

14. A laundry machine comprising:

a cabinet defining an internal cavity;

a lid secured to a top of the cabinet and configured to transition between open and closed positions; and first and second opposing hinges rotatably securing first and second lower corners of the lid to the cabinet, respectively, such that the lid transitions between the open and closed positions via the hinges, each of the first and second hinges comprising, a post protruding upward from the top of the cabinet proximate to an opening to the internal cavity, and an L-shaped bracket disposed along a bottom of the lid and configured to rotatably engage the corresponding post to transition the lid between the open and closed positions, wherein (i) each L-shaped bracket includes first and second legs, (ii) each first leg is disposed within a C-channel defined along a peripheral edge of the lid, (iii) each second leg is disposed along a back edge of the lid, (iv) each second leg rotatably receives the corresponding post, (v) a first internal surface of each L-shaped bracket partially defines a notch configured to receive a correspond post, (vi) each a first internal surface further defines a bushing orifice extending away from the notch, (vii) each post includes a base and a pin protruding outward from the base, (viii) each pin is disposed within the corresponding bushing orifice such that each L-shaped bracket and the lid are rotatable about the posts via the engagement between each pin and bushing orifice, (ix) a second internal surface of each L-shaped bracket partially defines the notch, and (x) each second internal surface is configured to engage the corresponding base to limit a rotational range of the lid and maintain the lid in the open position.

15. The laundry machine of claim 9, wherein the pin extends horizontally.

16. The laundry machine of claim 14, wherein the pin extends horizontally.

17. The laundry machine of claim 14, wherein (i) the first leg includes alignment protrusions extending therefrom, (i) the lid defines alignment orifices, and (iii) the alignment protrusions are configured to engage the alignment orifices to position the L-shaped bracket relative to the lid.

18. The laundry machine of claim 14, wherein the first leg defines tapped orifices.

19. The laundry machine of claim 18, wherein the lid defines through holes.

20. The laundry machine of claim 19 further comprising fasteners extending through the through holes and engaging the tapped orifices to secure the L-shaped bracket to the lid.

* * * * *